United States Patent
Bhargava et al.

(10) Patent No.: US 7,175,778 B1
(45) Date of Patent: Feb. 13, 2007

(54) SELF-ALIGNING QCA BASED NANOMATERIALS

(75) Inventors: Rameshwar Nath Bhargava, Ossining, NY (US); Vishal Chhabra, Ossining, NY (US)

(73) Assignee: Nanocrystals Technology LP, Briarcliff Manor, NY (US)

( * ) Notice: Subject to any disclaimer, the term of this patent is extended or adjusted under 35 U.S.C. 154(b) by 0 days.

(21) Appl. No.: 10/436,289

(22) Filed: May 12, 2003

Related U.S. Application Data

(60) Provisional application No. 60/379,726, filed on May 10, 2002.

(51) Int. Cl.
*H01F 1/00* (2006.01)
*C09K 11/02* (2006.01)

(52) U.S. Cl. ............. 252/62.51 R; 977/774; 977/779; 977/783; 977/811; 977/838; 977/834; 252/301.4 R; 252/301.4 S; 252/301.4 P; 252/301.4 F; 252/301.4 H; 252/301.5; 252/301.6 R; 252/301.6 S; 252/301.6 P; 252/301.6 F; 428/403

(58) Field of Classification Search ......... 252/301.36, 252/301.5, 301.4 R, 301.4 S, 301.4 P, 301.4 F, 252/301.4 H, 301.6 R, 301.6 S, 301.6 P, 252/301.6 F See application file for complete search history.

(56) References Cited

U.S. PATENT DOCUMENTS

| | | | | |
|---|---|---|---|---|
| 5,455,489 A | * | 10/1995 | Bhargava | 315/169.4 |
| 5,788,881 A | * | 8/1998 | Chadha et al. | 252/301.4 R |
| 6,036,886 A | * | 3/2000 | Chhabra et al. | 252/301.4 R |
| 6,090,200 A | * | 7/2000 | Gray et al. | 117/68 |
| 6,734,465 B1 | * | 5/2004 | Taskar et al. | 257/80 |

OTHER PUBLICATIONS

U.S. Appl. No. 60/331,683.*

* cited by examiner

*Primary Examiner*—C. Melissa Koslow
(74) *Attorney, Agent, or Firm*—William L. Botjer

(57) ABSTRACT

The present application is directed to the preparation and use of a class of nanoparticles called Quantum Confined Atoms or QCA's. A QCA is a particle of material comprising a plurality of host atoms in a nanoparticle of a size of less than 10 nm with a single atom of a dopant (or activator) confined within. The QCA's have unique luminescent and optical properties and thus can act as a very efficient nanophosphor which generate polarized light and can operate as a laser and a nanomagnet. An anti-agglomeration coating surrounding the nanoparticles can prevent clumping and loss of the enhanced properties.

17 Claims, 4 Drawing Sheets

A

B

- Quantum Confinement of $Tb^{3+}$-ion in 2-5 nm size $Gd_2O_3$ nanocrystal results in distortion of charge distribution of $Tb^{3+}$-ion ( From A to B)
- The magnetic $Tb^{3+}$ ion via spin-spin exchange interaction aligns all Gd ion leading to a nano-magnet

QUANTUM CONFINED ATOM (QCA)

- Quantum Confinement of $Tb^{3+}$ -ion in 2-5 nm size $Gd_2O_3$ nanocrystal results in distortion of charge distribution of $Tb^{3+}$ - ion ( From A to B)
- The magnetic $Tb^{3+}$ ion via spin-spin exchange interaction aligns all Gd ion leading to a nano-magnet

SELF-ALIGNING QCA BASED NANOMATERIALS

CLAIM FOR PRIORITY

This application claims the priority of U.S. Provisional patent application Ser. No. 60/379,726 filed May 10, 2002, entitled "Self-Aligned QCA Based Nanomaterials"

BACKGROUND AND SUMMARY OF THE INVENTION

This invention relates to nanotechnology which is the science of controlling and manipulating particles (atoms and molecules) smaller than 20 nanometers. A nanometer is approximately 75 thousand times smaller than the width of human hair, or about 3 to 8 atoms wide. Specifically this invention relates to the production of nanoparticles that self align and thus are capable of self assembly into useful devices.

Since the discovery of doped nanocrystals (DNC) in 1994 made from ZnS with Mn2+ as the dopant, (See R. N. Bhargava et. al. Physical Rev. letters 72,416 (1994)). Several applications of these class of DNC's have appeared (See U.S. Pat. Nos. 5,422,489, 5,422,907, 5,446,286, 5,455,489 and 5,637,258). The external luminescent quantum efficiency of ZnS:Mn2+ nanoparticles was measured to be about 20% as compared to best efficiency in the bulk material of about 16%. In all the earlier work on doped nanocrystals, the size of the host was estimated to be less than 10 nm for efficient generation of light. These materials were developed over several years for various applications. In all the applications and products, the light generated in the nanocrystals was associated with the dopant (also called an impurity or activator) while the absorption was associated with the host.

In recent years we have concentrated in preparing DNC materials that showed enormous increase in the light output as the size decreased below 5 nm (see R. N. Bhargava et. al. Phys. Stat. Sol. (b) 229, 897 (2002)) and references cited therein. Indeed it was projected in our earlier work and patents that the luminescent efficiency increases non-linearly as the size decreases. The earlier data and conclusions were based on aggregates of nanophosphors prepared under different conditions. Since we did not have the ability to isolate the sizes of the particles and measure the individual nanoparticles for the light output, we concluded that the efficiency critically depends on size, but the critical role of the nano-size host was not understood. Recent developments in the preparation and separation of the particles, along with microscopic-optical studies of individual nanophosphors had led to a greater degree of understanding of the role of a single atom in a nanoparticle. Several devices and applications and products now emerge from this newly found science of DNC. As it happens that we are controlling the properties of a single atom by caging it, we have renamed the DNC's as Quantum Confined Atoms (QCA). This application describes the properties of QCA and how the modulation of properties of a single atom yield next generation devices in nanotechnology.

What are QCA's

A single atom of the dopant (activator) is confined in a cage of a 2 nm to 5 nm size nanoparticle of the host compound (8 to 20 atoms in a linear chain) and is referred to as a quantum confined atom (QCA). This is schematically represented in the FIG. 1 where the atom is represented as a charged cloud, a correct quantum mechanical representation of an atom. When so confined, the QCA shows extraordinary changes in its optical and magnetic properties. These properties change non-linearly with decreasing size. For example, our research has led to the creation of 2 nm to 5 nm size luminescent phosphors with light output similar to phosphors of size 1,000 times larger.

Recently we have demonstrated that in QCA based nanomaterials, the efficiency of the light emanating from a single caged atom (ion) is the highest when the particle size is less than 5 nm. As the size decreases from 10 nm to 2 nm, the light form the caged atom increases non-linearly as shown in FIG. 2.

This has established for the first time that a single atom in the cage experiences the 'quantum confinement' effect and that generates efficient light. This discovery demonstrates that the properties of a single atom can be manipulated controllably, and will impact optical and magnetic devices and is expected to become a formidable branch of Nanotechnology. Furthermore, the QCA's produced herein show self aligning (self-organizing) properties which can lead to self assembling nanodevices which is a significant step as it moves nanoparticles from the laboratory to commercially useful devices.

In conventional usage, classical phosphors comprise a host compound and a small amount of impurities that are referred as activator (or dopant). The absorption of the excited emission occurs within the manifold of energy-states that are either from the host or a combination of the host and activator. The emission is the characteristic radiative transition associated with the activator. From this classical definition of phosphors, we can designate QCA based luminescent materials as nanophosphors since the host is nanosize and the light emission is generated by the atomic ion (QCA). The hosts and activators associated with bulk phosphors when prepared in the size of 10 nm or below, result in efficient nanophosphors. The hosts and activator combination that do yield efficient bulk phosphors with size in the range of 1 to 10 microns can also be prepared as efficient nanophosphors. Additionally the quantum confinement of the activator ion allows us to prepare new luminescent materials that otherwise do not yield high efficiency in bulk form.

In bulk phosphors, the optimum concentration of activator is about 1% of the ion it is replacing. The activator is distributed statistically in the bulk phosphor. This random distribution activator-ions lead to separation from each other anywhere from 3 to 30 lattice spacing which corresponds to approximately 7 Å to 70 Å for a typical lattice spacing of 2.3 Å (0.23 nm). In the case of QCA based nanophosphors, recent studies (M. D. Barnes et. al, J. Phys. Chem. B 104 6099, 2000; and A. P. Bartko et. al. Chemical Physics Letters 358 459, 2002.) suggest strongly that there is either one activator-ion or zero activator-on per nanocrystal. The probability of incorporation of the single activator-ion in ananocrystal critically depends on the preparative methods, the starting concentration of activator-ion with respect to the ion it replaces and the size of the host.

The relative concentration of activator ion in the host changes significantly as the size of the phosphor particle decreases from bulk size (>50 nm) to nanosize (<10 nm). The statistical random distribution is shifted to binary distribution (either 0 or 1 activator ion in one nanoparticle). For example, a ZnS nanophosphor of size 5 nm would contain approximately 8000 total atoms for a lattice spacing of 2.5 Å and a simple cubic-crystal. The number of Zn sites in the crystal would be 4000. If one of the Zn-sites is replaced by $Mn^{2+}$ ion, the concentration of $Mn^{2+}$ relative to Zn would be 1/4000=0.025%. In bulk ZnS: $Mn^{2+}$ phosphors, the optimum concentration of $Mn^{2+}$ ion relative to Zn-atom in the nanocrystal for best luminescent efficiency of $Mn^{2+}$ emission is determined to be about 1%. This concentration is approximately 40× higher than estimated for the best luminescent efficiency in nanophosphors of ZnS:$Mn^{2+}$. This suggests that the activator ion like $Mn^{2+}$ is 40 times more efficient in a nanophosphor than in bulk size. The dopant atom should satisfy the criteria that the valence state of the dopant atom conforms with one of elements of the host compound that it replaces and that the ionic charge-state and the size of the dopant atom is compatible with the ion in the host it is replacing.

The present application is directed to the preparation and use of a class of nanoparticles called Quantum Confined Atoms or QCA's. A QCA is a particle of material comprising a plurality of host atoms in a nanoparticle of a size of less than 10 nm with a single atom of a dopant (or activator) confined within. The QCA's have unique luminescent and optical properties and thus can act as a very efficient nanophosphor which generate polarized light and can operate as a laser and nanomagnet. An anti-agglomeration coating surrounding the nanoparticles can prevent clumping and loss of the enhanced properties.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
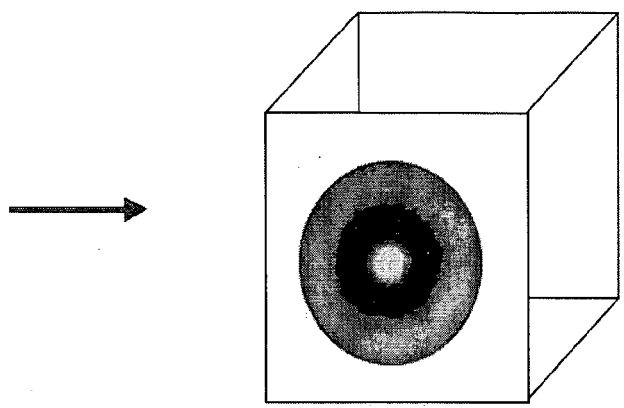
FIG. 1 is a schematic representation of a Quantum Confined Atom (QCA)

We have made QCA-nanophosphors by different chemical processes. These methods are chosen to obtain either nanophosphors as powder or dispersed in a solution for different applications. In powder nanophosphors, the coating on the surface of the nanoparticle is designed to maintain the nanosize and prevent their growth to larger size particles. The nanophosphor is prepared such that it is coated with a thin film on the surface, preventing agglomeration and simultaneously providing passivation of the surface. The surface-passivation leads to high luminous efficiency.

In the case of a solution dispersed with nanophophors we have chemically modified the surface of the nanophosphors during their preparation by attaching different chemical groups referred as chelating agents or dispersing agents or ligands. The choice of these chemical groups depends on the solvent because the 'chemical group' must be compatible with the solvent, otherwise the dispersed nanophosphors will precipitate over time. These chemical groups prevent nanophosphors to agglomerate in solution rendering the solution scatter-free and optically transparent.

Procedure for Nanophosphor Powders

Either microemulsion or wet co-precipitation processes were used to make QCA's. In the microemulsion process a monolayer of surfactant acts as a passivation layer and in the other process an inorganic salt coating passivates the nanoparticles.

The co-precipitation process begins with the preparation of an aqueous solution containing compounds of activator and host. In a first exemplary embodiment, yttrium chloride was used for host and terbium or europium chloride were used for activator. This mixture was co-precipitated as hydroxide in aqueous medium with a very high pH. In this process particles have a coating of inorganic salt around which helps to keep these particles stay deagglomerated.

In the micellar process the reaction takes place in aqueous core of water-in-oil microemulsion. We selected a microemulsion with CTAB (cetyl trimethyl ammonium bromide) as a surfactant, butanol as co-surfactant, octane as a continuous oil phase and host/activator electrolyte as the dispersed aqueous phase. We took two microemulsions (Microemulsion I and Microemulsion II) with identical composition but different aqueous phase. The aqueous phase in Microemulsion I was Yttrium Chloride (host) and terbium chloride or europium chloride (activator), whereas the aqueous phase in Microemulsion II was precipitating agent Ammonium hydroxide.

The compound containing the host and activator materials are proportioned so that the amount of the activator compound is 1–20%. These two microemulsions were mixed with vigorous stirring at room temperature. This leads to the formation of host material hydroxide doped with the activator within the aqueous core of the microemulsion. The precipitate was centrifuged and washed with solvents to remove the loose surfactants and contaminated oil. These particles were calcined at 300–500 C with proper conditions to have high efficiency and maintain small size. For detailed information see U.S. Pat. No. 6,036,886 entitled "Microemulsion Method For Producing Activated Metal Oxide Nanoparticles" the disclosure of which is hereby incorporated by reference.

How the material is made permits the incorporation of a single atom in a nanoparticle of 2 to 5 nm in size. The use of chemicals and concentration range allows the increase the probability of incorporation of a single activator ion in a nanosize particle. The goal is to incorporate a single activator ion in the host when the size decreases from 10 nm to 2 nm. The probability of incorporation rapidly decreases as the size decreases, Therefore, in order to avoid small particles being void of activator, a molar concentration of starting activator-ion solution is used that is 5× to 10× higher than the conventional phosphors use. This allows the obtaining of a significant fraction of 2 to 10 nm particles that have a single ion. This is important to obtain efficiencies much higher than earlier obtained.

The present invention can be used with a variety of phosphors comprising host materials such as $Y_2O_3$, $Gd_2O_3$, $Gd_2O_2S$ and PbO. Each of these may be doped with europium which will cause the phosphor to emit red light, terbium which will emit green and thulium which will emit blue. Other suitable host materials are zinc sulfide (ZnS) and zinc oxide (ZnO) cadmium oxide (CdO) and cadmium sulfide (CdS) which can be doped with manganese (Mn) as well as transition and rare earth metals.

Procedure for Making Nanophosphors in Solution

A problem that exists with respect to nanoparticles is their tendency to agglomerate into packs of larger sized particles which causes non-uniform clumps of particles when the nanoparticles are dispersed in a matrix for further application as is described in detail later. The physical properties of the nanoparticles are enhanced if agglomeration can be avoided. The agglomeration can be eliminated and controlled by the provision of an anti-agglomeration coating on the particles. The anti-agglomeration coating may comprise a dispersing agent that attaches to the surface of the nanoparticles. Dispersing agents include alkoxysilane, octylphosphine oxide, carboxylic acid, stearic acid, mercepto acetic acid, polyphosphates, polyethylene glycols and oleic acids. The chemical structure of the thin coating and its control helps to create nanoparticles and nanophosphors that can be dispersed in different solvents that includes water and alcohol.

In another exemplary embodiment and process, $Y_2O_3$: Eu and ZnS: Mn nanoparticles were prepared in non-aqueous medium in order to reduce the possibility of forming hydroxides. Dehydrating properties of non-aqueous or controlled hydrolysis of metal salts in non aqueous medium leads to formation of oxides. In order to prevent particle agglomeration a surface capping or chelating agent is required. Typical synthesis were as follows:.

For ZnS doped with manganese, acetate salts of Zinc and Manganese in the molar ratio of 0.05–1.0 M were dissolved in Methanol. TOPO (Tri-octylphosphine oxide) dissolved in methanol in different ratios to the metal salt concentration was used as capping agent. To this a Sodium sulfide solution dissolved in methanol was added dropwise in order to precipitate nanoparticles.

$Y_2O_3$ doped with Eu was made by dissolving metal chlorides, ($YCl_3$ and $EuCl_3$) in a ratio of 85–95% $YCl_3$ to 5–15% $EuCl_3$, in a high boiling point alcohol, such diethylene glycol. A controlled amount of aqueous NaOH was added to the solution and heated to 180° C. for 2–4 hrs. As soon as the oxide forms the alcohol binds to the surface and prevents the agglomeration of the nanoparticles. Luminescence of these particles was confirmed from PL/PLE spectra and size was confirmed with AFM. The chlorides of many other metals can be favorably used in this process.

These techniques could be used to make different nanoparticles of oxides, chelcogenides, phosphates, silicates, and vanadates and with different dopants for example Tb, Ce, Cr, Pr, Eu, Mn, Cu and Ag etc. The DNC's of the present invention can also be combined with one of the following dispersing agents that attaches to the surface of the nanoparticles. Dispersing agents (chelating agents) include alkoxysilane, octylphosphine oxide, carboxylic acid, stearic acid, mercepto acetic acid, polyphosphates, polyethylene glycols and oleic acids. These dispersing agents are added in a controlled manner so as to form a thin (one or two monolayer) coating.

These optically transparent nanophosphors dispersed in a solution show very high efficiency. Where as the undoped semiconductor quantum dot based luminescent nanoparticles absorb the light near the bandgap and emit light in the near vicinity. These overlapping absorption and emission bands for visible light generation not only render the solutions colored but make it difficult to extract all the light out.

The dispersed solution with specific bond (ligand or chemical group) attached to the nanophosphor or nanoparticle further allows us to incorporate them in polymers, epoxy and silicones etc. In each case, incorporated nanoparticles/nanophosphors allow us to modify the average bulk properties of a clear epoxy that can be used as a matrix material. As an example, we have increased the refractive index of the epoxy from 1.4 to 1.8 by incorporating 35 volume percent of nanoparticles with the epoxy remaining optically clear. The high refractive indices obtained can be made transparent in the visible spectral range. This has applications in the monochrome and white LED-lamps. The control of size and the coating of nanophosphors allows us to disperse these nanophosphors in different solvents where the nanophosphor-particles do not agglomerate. They retain their high luminescent efficiency. The caged ion of QCA nanophosphor is well protected.

The thin coating can be further modified to have an active chemical bond that could be effectively used to bind to other chemical molecules (organic or inorganic), proteins and antibodies. These modified surfaces are then used for biotagging, preparing nanocomposites (such as high refractive index encapsulant for LEDs), transparent downconverter and other applications. The examples of coating modifications (binding coatings) on the nanophosphor are phosphate ($-PO_4$), amine ($-NH_2$), vinyl ($-nCH_2-CH_3$), carboxyl ($-COOH$), and thiol ($-SH$). This group of active groups provide the bridging to antibodies and proteins for the purpose of generating a luminescent tag.

Preparation of Nanophosphor Samples for Measurements 1 mg of the heated $Gd_2O_3$:$Tb^{3+}$ sample was sonicated in 10 ml of aqueous solution. It was further diluted 3–10 fold and sonicated again. 5 μl solution was taken from this solution from the top of the container for all the studies. The solution was dispersed over a glass slide so that we could study individual nanoparticles and their properties. The properties particularly the luminescent characteristics of these individual nanoparticles containing a single ion (impurity or dopant) are discussed below.

Self Organized Structures of $Gd_2O_3$ Doped with Tb3+ Ion

The nanoparticles of $Gd_2O_3$:$Tb^{3+}$ prepared by micellar process when left in a dilute gel, show self-organization in a single dimension i.e. quantum wire formation from 2 nm–5 nm nanoparticles. This is shown in a TEM micrograph (FIG. 3) where the bundle of 'linear rods' (quantum wires) are typically 1μ in length less than 10 nm in width. The quantum wires are being formed during a well-controlled drying process. Further work is being done to understand the role of substrate-surface preparation, thermal treatment and the magnetic interaction among $Gd_2O_3$:$Tb^{3+}$ nanoparticles.

Figure 3:
FIG. 3 is a photomicrograph showing self organization of the QCA nanoparticles to form linear rods.
Figure 7:
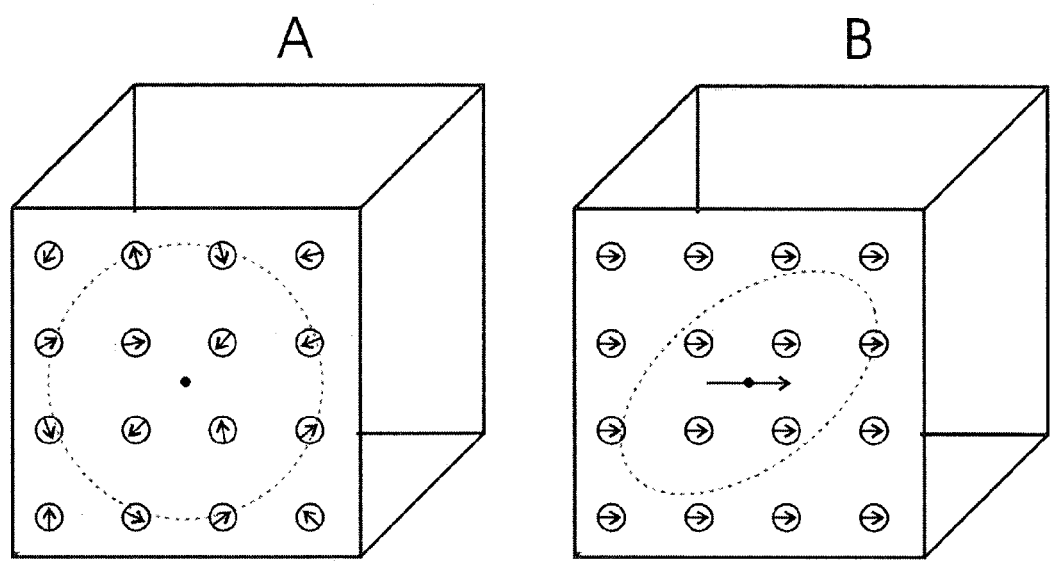
FIG. 7 is a schematic representation of the magnetic alignment of a QCA.

The self organization or self-assembly of the nanoparticles to form linear rods observed in FIG. 3 can be understood on the basis of the choice of the host and choice of the atomic impurity. Since we are always dealing with a single dopant-impurity in a nanosize cage the self-organization properties depend critically on the choice of both the dopant and the host. This additional degree of control allows us to build structures far better than known today. An example of this precise control was observed in QCAs of $Gd_2O_3$:$Tb^{3+}$ as depicted in FIG. 3. The quantum confinement imposed by $Gd_2O_3$ nanocrystal on Tb-ion polarizes the atom yielding a fixed direction Tb-spin. Since the Tb-ion has 7 electrons with spin 'up' and one with spin 'down', the net spin of a single atom is 3 (7/2–1/2). The Gd-ion in Gd2O3 nanocrystal has 7 electrons all pointing 'up' yielding 7/2 spin. The polarized Tb-ion spin (atomic magnet) polarizes all the Gd-ions due to exchange interactions and aligning all the Gd-ions, each being an atomic magnet, this process is schematically illustrated in FIG. 7. Thus QCA based nanocrystal in the size range of 2 to 5 nm is converted into a nano-magnet. These nano-magnets in a gel are free to move.

In a slow evaporation process, these magnets align leading to formation of linear rods, the results are evident in FIG. 3.

Results of Efficiency as a Function of Concentration

The incorporation of an ion (atom) in nanocrystal of sizes in the range of 2 to 5 nm is very different than incorporation of the same impurity in the bulk. The key differences are outlined below:

1. In bulk materials the optimum concentration of activator (e.g. Tb, Eu) is about 0.5% to 1.0% of the host ion (e.g. Y in Y2O3) concentration. Beyond this concentration the efficiency of the emission from Tb or Eu decreases rapidly due to its interaction with another Tb or Eu ion and is commonly referred as decrease of light out put due to 'concentration quenching'.

2. If we dope the nanoparticles such that there is a single ion of Tb or Eu in 3 nm nanocrystals the estimated concentration range would be about 1 (Tb)/1000 (Y)=0.1%. For larger size particles beyond 3 nm since we retain one ion per particle the concentration decreases beyond 0.01%.

3. Normally in the bulk the efficiency at these low concentrations is extremely low as depicted in line 4a of FIG. 4.

4. The fact that very low concentration of the dopant ion in a QCA is still yielding very high efficiency suggests strongly that the concentration is not playing a critical role in controlling the efficiency. We need only one dopant ion per nanoparticle and that the dopant is far more efficient than the statistical distribution of dopants in the larger bulk particles.

5. The role of a single dopant ion in a nanocrystal is the essence of QCA's.

6. In order to incorporate a single dopant ion in a nanocrystal, the chemistry of preparation has to be adjusted. For example, the probability of incorporating the dopant ion in the host decreases rapidly as the size of the host size decreases. In order to increase the probability of incorporation in smaller particles, we increase the concentration of the dopant ion in starting reactant five to ten fold. The higher concentration ensures that the smallest of the particles have a single dopant ion that is necessary for the light generation.

Figure 4:
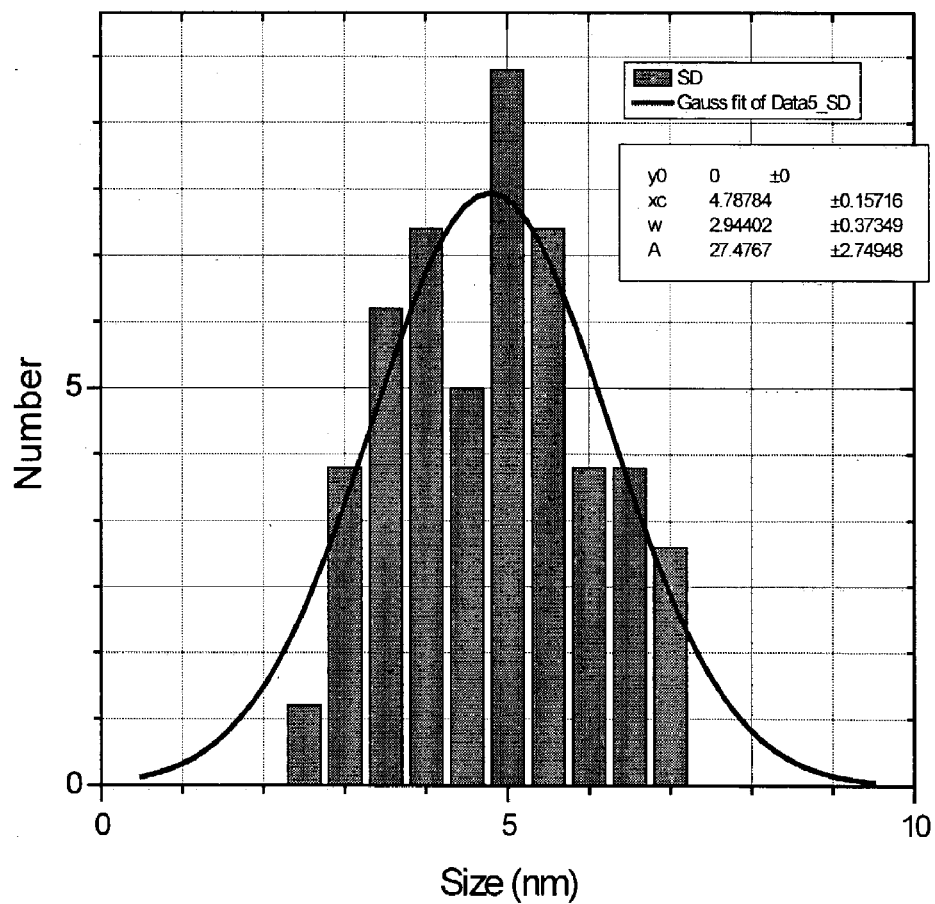
FIG. 4 is a graph of the size distribution for unagglomerated QCA nanoparticles prepared in accordance with the invention.

7. Size distribution: The size of the separated particles when measured using atomic force microscope that yield the average heights of the solid spherical like nanoparticles. The distribution for the unagglomerated particles is shown in FIG. 4. This clearly establishes that we are dealing with nanoparticles in the range of 2 to 7 nm.

Figure 2:
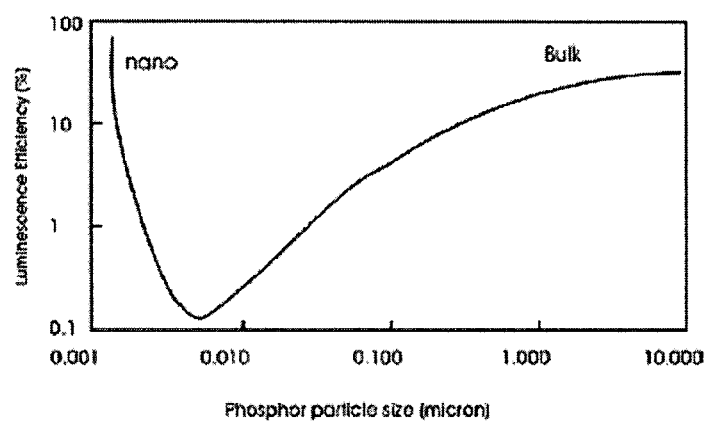
FIG. 2 is a graph of light output of a QCA as a function of size.
Figure 5:
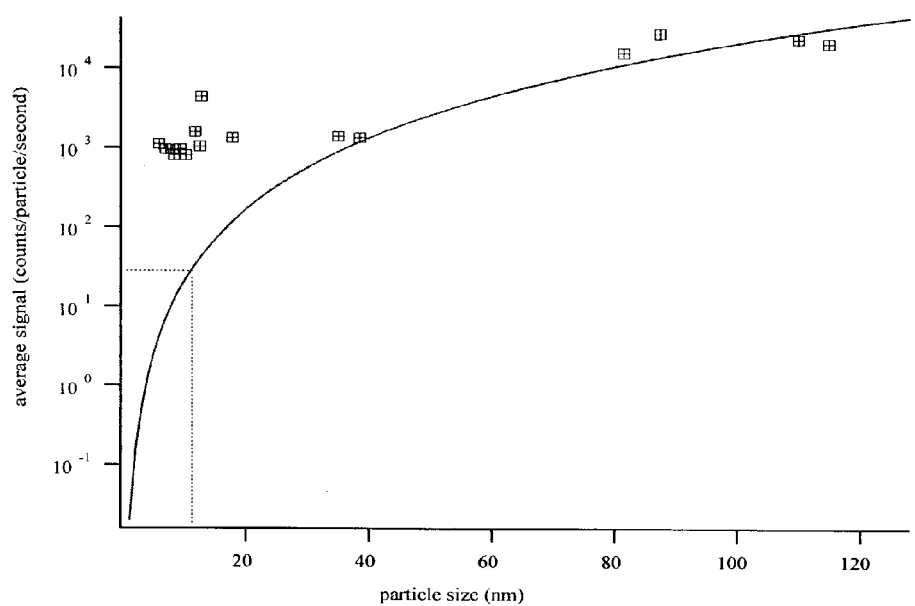
FIG. 5 is a graph of the particle size versus signal strength (light output) for various size phosphors.

The smaller the particle, the higher is the efficiency as seen in FIG. 2 and confirmed recently using separated nanoparticles. The recent data shown in FIG. 5 below on individual particles, establishes unequivocally that QCAs in smaller cages are more efficient than in the larger cage.

Additional Properties of QCA Based Nanoparticles

Figure 6:
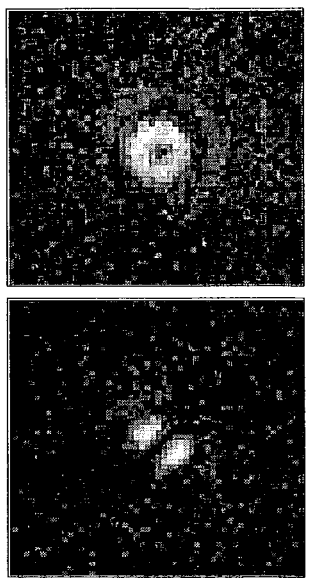
FIG. 6 is a photomicrograph showing polarized light output of the QCA nanoparticles.

When an atom is confined by the dielectric boundary provided by a nano-cage, the electron distribution as shown in FIG. 1 no longer is expected to be spherical or symmetrical. The charge cloud of the single atom begins to acquire the shape of the host and thereby becomes asymmetric. The asymmetry in the charge distribution can lead to several changes in the luminescent and magnetic properties of the QCA. For example, the light emanating from a single QCA could be linearly polarized as seen in FIG. 6. The light from a single QCA when seen through a 45 degree polarizer splits the radiation pattern just like a radiation of a molecule. Thus a single atomic ion of QCA, when distorted in a nano-cage behaves like a molecule.

The asymmetric properties of the QCA that lead to generation of linearly polarized light suggest that we indeed have a possibility of atomic magnets. If the atomic-ion and the host are chosen with proper electron spin, we expect to convert the QCA into a magnetic domain. The fact that we have magnetic domain of 2 to 5 nm and that emits linearly polarized light suggests that these materials are good magneto-optical materials. The read and write magneto-optical discs with very high densities are now possible using QCA based materials.

The control and modulation of a single atomic ion in cage of 2 to 5 nm has allowed us to develop several unique properties. These properties are based upon our invention of engineering the nanocrystal properties by confining an atom in this size. The properties of the QCA based materials are dictated by both the choice of the atom and the host. The discovery of QCA has led to following breakthrough technology, we are able to modify the properties of a single which allows us to design individual nanocrystals utilizing an unique quantum effect.

1. The quantum confinement of a single atom modifies the property of the atomic-ion.

2. The confined atom in turn creates QCA-nanoparticles with unique properties such as magnetic and luminescent.

3. These nanoparticles when self assembled lead to microstructures that can lead to real devices and products.

Applications for QCA's

Lasers

When two identical atoms come close to each other, the excited electrons interact so as to kill the luminescence from the excited state, this is usually referred as concentration quenching. Concentration quenching prevents the laser action in many elements. Since a QCA has a single atom in a cage, the atom is protected from interacting with another similar atom thus preventing concentration quenching. The inherent lack of concentration quenching makes QCA based materials to be one of the best lasing materials. The gain in nanoparticles is high and the high efficiency of the atomic transition and the non-linear dependence on size, makes the smallest particle as the best candidate for low threshold lasers. The lasing wavelength is the characteristic emission of the activator atom, not the host. The QCA materials when incorporated in a transparent matrix (polymer or glass) can lead to lasers of different colors.

Magneto-Optical Devices and Sensors

The confinement of the activator atom by the host compound changes the spherical charge distribution of the electron-cloud of the atom to more like pancake like electron-cloud, this change in 17 results in the generation of polarized light from the QCA. This confinement also leads to polarization i.e. the atom has been transformed from a symmetric atom to an asymmetric atom. The confinement induced asymmetry is very useful for making device structures. The asymmetry induced in material like $Gd_2O_3$:$Tb^{3+}$ can make the nanoparticles magnetic due to interaction of the spin of Tb-atom and the spins of Gd-atoms. The polarized spin of Tb-atom aligns all the Gd-atom spins leading a small domain like nano-magnet. These nano-magnets, if left in a solution under an appropriate environment, lead to self organized structures. Each nanomagnet aligns with the neighboring nanomagnet leading from beads (nanoparticles) to necklace (nanowire) like structures.

These QCA based nanowires can be embedded into Silicon based Hall sensors, the magnetic field can be measured accurately and with great sensitivity. Such sensors are useable in automotive, electronic, global positioning and magnetic recording systems. The current GMR based high density micro-disc can be surpassed using QCA-based nanomagnets. These nanomagnets are also optical active. The combination of polarized light, and magnetic alignment is expected to yield very sensitive Kerr effect/Faraday rotation magneto-optical devices and memories.

The Nanocomposites created by incorporating nanomagnets in different matrices will enhance the magnetic susceptibility of nanocomposites. This will have numerous applications. If the susceptibility of magnetic core in motors can be enhanced by 10%, it is major contribution to energy saving. The asymmetry of a QCA also leads to on and off blinking. The four different blinking states associated with the this caged ion are observed. This leads to possible quaternary computer logic instead of binary and their control enhances the possibility of optical computer. The computer can be addressed by laser light and modulated by magnetic interaction. Thus a new magneto-optical based computer will emerge.

The self-organized magneto-optical devices will have impact in sensors, particularly in the realm of biological and medical applications. The QCA's with their enhanced optical and magnetic properties are ideally suited for all bio-tagging applications. Specificity defined by the precise color and stability of the atomic emission due the protection of cage makes this one of the best candidate to replace current tagging dyes. The ability to change the atom in the same host to provide different color and different magnetic properties, will allow the custom tailoring of the QCA based materials for different applications. Not only can the emission be controlled but also the absorption.

Optical Property Enhancement

As described above QCA's in a solution or embedded in a matrix can modify the optical properties (index or refraction and light emission) of a material on which they are coated. The solutions of QCA's with high refractive index (1.8) and containing nanophosphors described above, when applied as a coating on glass surface of chandeliers, glass jewelry and other glass ornaments and decorative objects can yield a surface which can convert blue/UV light to any color in the visible spectrum. The transparent coating when excited by blue or UV light can generate visible "painting like" images on surfaces which have been coated. The vibrant and bright nature of glass displays is expected to change the way glass displays are viewed today.

Another, unique application of these nanophosphor solutions is in hair spray and hair shampoo. In hair spray, a polymer solution of refractive index 1.3 to 1.4 is sprayed on to hair so as to trap the light. The trapped light is what produces the shine. The increase of refractive index from 1.4 to 1.8 would increase the amount of light thereby increasing the shine and luster of the hair. Another application is for hair shampoo, in this application the down conversion properties of the nanophosphor solution are used to convert blue/UV light of the solar radiation or indoor UV light to any color in the visible. This enhances the natural color or the artificial color of the hair under light. The nanophosphor in high or regular refractive index coating will provide these cosmetic advantages. The same nanophosphor solutions when used with detergent will enhance the brightness (including white) of the clothing. The clothes will look brighter than with the regular detergent.

Thus in the coming decade, we expect engineering of an atom (ion) in the nano-regime utilizing QCA's yielding self-assembled microstructures to impact significantly in science (including life-sciences) and technology. The present invention has been described with respect to exemplary embodiments. However, as those skilled in the art will recognize, modifications and variations in the specific details which have been described and illustrated may be resorted to without departing from the spirit and scope of the invention as defined in the claims to follow.

What is claimed is:

1. A particle of material comprising a plurality of host atoms in a nanoparticle of a size of less than 10 nm with a single atom of a dopant confined within, and an anti-agglomeration coating surrounding the nanoparticle, the anti-agglomeration coating surrounding the nanoparticle being selected from the group consisting of alkoxysilane, octylphosphine oxide, carboxylic acid, stearic acid, mercepto acetic acid, polyphosphates, polyethylene glycols and oleic acids.

2. The particle as claimed in claim 1 wherein the nanoparticle has a size of less than 5 nm.

3. The particle as claimed in claim 1 wherein the dopant atom is a rare earth element.

4. The particle as claimed in claim 1 wherein the dopant atom is luminescent when excited by radiation.

5. The particle as claimed in claim 1 wherein the dopant atom emits polarized light when excited by radiation.

6. The particle as claimed in claim 1 wherein the anti-agglomeration coating is modified with binding groups to enable the particle to bind to other molecules.

7. The particle as claimed in claim 6 wherein the binding group modifying the anti-agglomeration coating is selected from the group consisting of phosphate ($-PO_4$), amine ($-NH2$), vinyl (-$nCH2-CH3$), carboxyl ($-COOH$), and thiol ($-SH$).

8. A self aligned structure comprising a multiplicity of magnetically polarized nanoparticles of a size of less than 10 nm, each nanoparticle comprising a multiplicity of $Gd_2O_3$ host atoms with a single atom of a $Tb^{3+}$ dopant confined, the magnetically polarized nanoparticles being aligned into the structure with each other by the action of their magnetic polarization.

9. The self aligned structure as claimed in claim 8 wherein each nanoparticle has a size of less than 5 nm.

10. The self aligned structure as claimed in claim 8 wherein the dopant atom is a rare earth element.

11. The self aligned structure as claimed in claim 8 wherein the dopant atom is luminescent when excited by radiation.

12. The self aligned structure as claimed in claim 8 wherein the dopant atom emits polarized light when excited by radiation.

13. The self aligned structure as claimed in claim 8 wherein the structure is rod like.

14. The self aligned structure as claimed in claim 8 wherein the structure is dispersed within a gel that enables self alignment of the nanoparticles and thereafter dried in a controlled process.

15. A nanocomposite comprising a multiplicity of magnetically polarized nanoparticles of a size of less than 10 nm, each nanoparticle comprising a multiplicity of $Gd_2O_3$ host atoms with a single atom of a $Tb^{3+}$ dopant confined within, the magnetically polarized nanoparticles being self aligned into a structure with each other by the action of their magnetic polarization.

16. The nanocomposite as claimed in claim 15 wherein the magnetically polarized nanoparticles are dispersed within a dried gel.

17. The nanocomposite as claimed in claim 15 wherein the structure is rod like.

* * * * *